(No Model.)
G. H. SELLERS.
CHUCK.
No. 574,077. Patented Dec. 29, 1896.
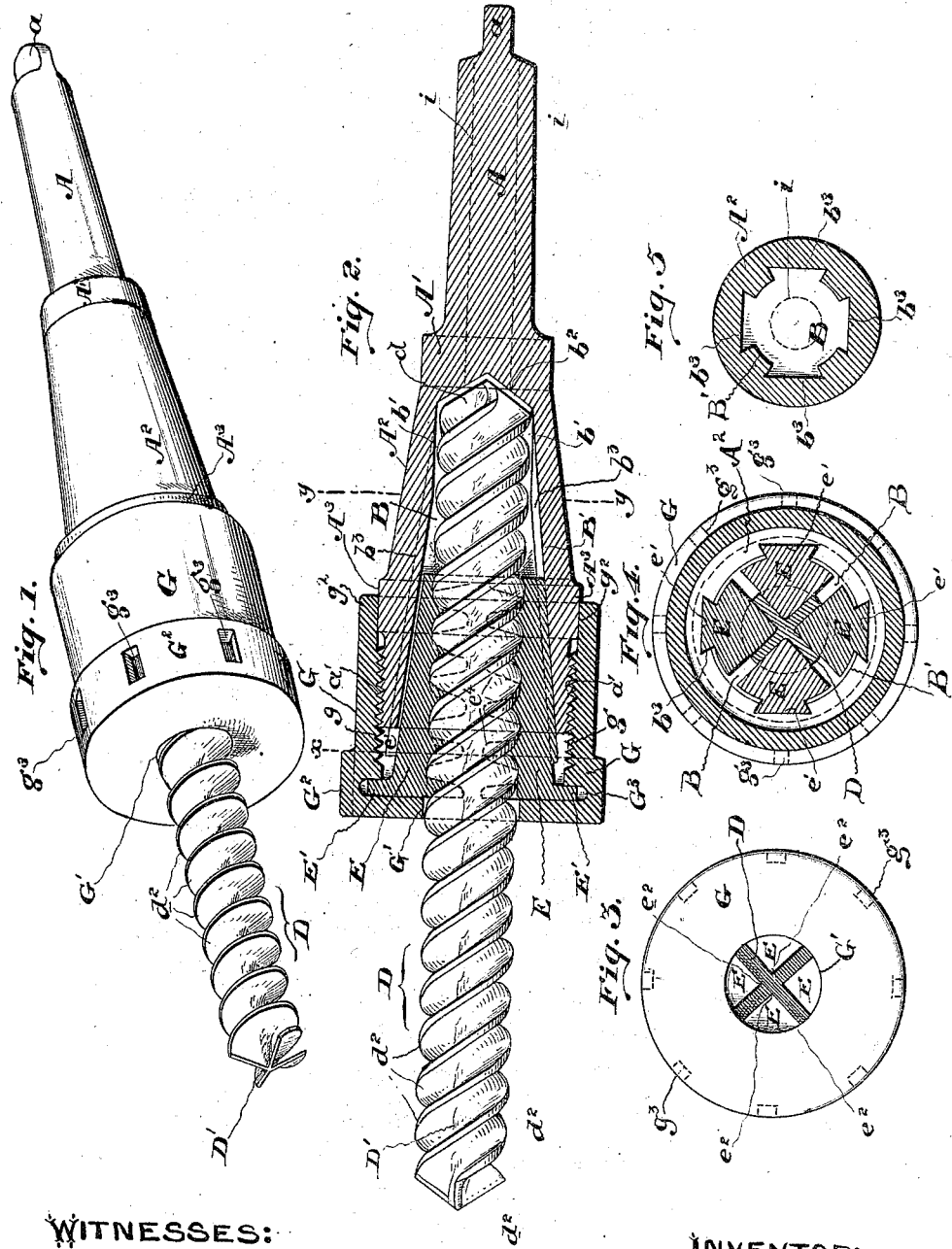
WITNESSES:
Joshua Matlack, Jr.
H. W. Hare Powel.
INVENTOR:
George H. Sellers
by his attorney
Francis T. Chambers

UNITED STATES PATENT OFFICE.

GEORGE H. SELLERS, OF RIDLEY PARK, PENNSYLVANIA.

CHUCK.

SPECIFICATION forming part of Letters Patent No. 574,077, dated December 29, 1896.

Application filed June 28, 1890. Serial No. 357,136. (No model.)

*To all whom it may concern:*

Be it known that I, GEORGE H. SELLERS, of Ridley Park, Delaware county, State of Pennsylvania, have invented a new and useful Improvement in Chucks, of which the following is a specification, reference being had to the accompanying drawings, forming a part thereof.

My invention relates to a self-centering drill-chuck especially adapted to grasp a particular form of twist-drill, but also adapted to act as a general grasping and driving drill or lathe chuck.

Among the objects of my invention is to provide a compact drill-chuck, the grasping-jaws of which are so arranged as to grasp and securely hold between them the flanges or bands of a special fluted drill and also, if required, to hold any form of drill or other instrument adapted to be held in a drill or lathe chuck; also, to so arrange the grasping-jaws that they will remain in position in the chuck and not be removed therefrom, even if not grasping or when not securely held by the mechanism designed to force the jaws into firm engagement with the drill or other object being held.

Another object of my invention is to arrange the forcing mechanism for the jaws so that it will have to endure no strains of driving or twisting. These advantages I attain by the novel devices and combinations of devices illustrated in the drawings, and my invention will be best understood as described in connection therewith.

In said drawings, Figure 1 is a perspective view of the preferred form of my improved chuck shown grasping a drill. Fig. 2 is a longitudinal section of the chuck shown in Fig. 1, the drill being shown entire. Fig. 3 is a front view of the chuck, the drill being shown in section. Fig. 4 is a cross-section through the chuck on line $x\,x$ of Fig. 2. Fig. 5 is a cross-section on the line $y\,y$ of Fig. 2, the drill being removed.

A $A^2$ represent a chuck constructed according to my invention and adapted to firmly grasp a special drill D. This drill and the manner of constructing the same form the subject of my Letters Patent No. 443,297, dated December 23, 1890. It is sufficient, therefore, to observe that it consists, essentially, of a core D' and substantially helical flanges or threads $d^2$, surrounding the core D'. The shank A of the chuck is preferably made of standard taper and has a flat flange $a$, adapted to fit a corresponding socket in a drive mechanism or in a lathe-mandrel nose.

At A' the chuck is enlarged and extends forward, preferably in the form of a cone, forming the guide portion $A^2$. A conical socket or cavity B, adapted to receive the drill, is formed in the chuck, and to adapt it to the special drill D, I preferably form the conical cavity B at the rear with a cylindrical portion $b'$ and end this with an obtuse conical recess $b^2$, of a shape to fit the end $d$ of the drill.

E E represent jaws specially adapted to hold the drill D, but also capable of holding any drill or suitable tool. These jaws, of which there are at least two, are made of a shape to fit loosely in the inside of the cavity of the chuck and are formed, preferably, with a flange, as E', and a flat face on the front thereof. In order to hold these jaws firmly in the chuck, I preferably arrange on the backs of the jaws which bear against the inside of the cavity of the chuck beveled ribs, as $e'$, adapted to fit in correspondingly-dovetailed grooves, as $b^3$, in the periphery of the cavity.

It is of course obvious that the grooves may be made in the jaws and the ribs be formed with the chuck, but the construction shown is the one I prefer.

On the inside or clutching part of the jaws are arranged flanges $e^4$, which form sectional female threads corresponding in pitch and size to the pitch and size of the openings between the flanges $d^2$ on the drill D.

The front of the chuck is threaded at $a'$, and fitting over it and screwing thereon is a forcing cap or sleeve G, centrally perforated at G' to admit the drill D, and screw-threaded at $g'$ to screw on the threaded portion $a'$ of the chuck. In order to insure a tight fit, a reinforce or rib, as $A^3$, is formed around the chuck-body and the inside of the cap is cut at $g^2$ to neatly slide over the rib $A^3$, preventing dust and dirt from entering and clogging the threaded portion $a$ of the chuck.

The front of the cap G bears against the jaws and forces them into the tapering cavity B; but in order to withdraw the jaws from the socket of the chuck positively I preferably form in the cap a groove, as $G^2$, into which the flanges E' of the jaws E are adapted to fit. This groove also forms a channel for any oil or grease which may run down to the lower part of the apparatus when in use. Sockets $g^3$ for the introduction of a proper turning-tool may be formed, as shown, in the rim $G^2$ of the cap G, and, if desired, a counterbore $i$ may be made in the rear of the chuck, as shown in dotted lines.

Preferably four jaws are arranged in the chuck and are held therein by ribs and grooves, as explained, and when holding my special drill the flanges $e^4$ of the jaws project into the spaces $e^2$ between the threads $d^3$ of the drill, and the body of each jaw bears against the outer edge of the screw-threads $d^2$, firmly holding the drill in position. As the jaws are held by their ribs $e'$, which fit into grooves $b^3$ in the chuck-body from lateral displacement, all the stress and strains due to driving are taken up by these jaws and the forcing-cap G is free from all such strains and has no duty but to force the jaws into position and hold them securely in firm contact with the drill.

If the special drill be removed, it is evident that any drill or other tool it is desired to hold which is of approximately the same size as the core D' of the special drill can be inserted and will be firmly held by the flanges $e^4$ of the jaws.

Having now described my invention, what I claim as new, and desire to secure by Letters Patent, is—

1. In a chuck, the combination of a chuck-body having a socket or cavity therein, a series of jaws E which are adapted to slide in said cavity, each having a flange as E', and a forcing-cap having a central perforation G of substantially the same size as the drill or other object to be grasped and provided with a groove as $G^3$ in which the flange E' is adapted to fit, whereby the jaws may be given positive motion in both directions; the whole so arranged, that in operation the cap will serve to protect the jaws.

2. In a chuck the combination of a chuck-body, jaws held from lateral displacement in a socket as B in said body, lugs, ribs and grooves relatively arranged in the socket and jaws, and flanges on the inner side of the jaws forming the female part corresponding to a drill designed to be grasped by the jaws of the chuck.

GEO. H. SELLERS.

Witnesses:
LEWIS R. DICK,
H. W. HARE POWEL.